United States Patent
Kompalli et al.

(10) Patent No.: US 12,094,360 B1
(45) Date of Patent: Sep. 17, 2024

(54) APPARATUSES AND METHODS FOR PRACTICING A REDUCTION PROCEDURE FOR TREATING RADIAL HEAD SUBLUXATION

(71) Applicant: University of South Florida, Tampa, FL (US)

(72) Inventors: Koundinya Kompalli, Tampa, FL (US); Corey Richard Sargent, Dunedin, FL (US); John Todaro, Tarpon Springs, FL (US); Teresa N. Gore, Palm Harbor, FL (US); Sharlene Hope Smith, Clermont, FL (US); Patricia Cecil, Clermont, FL (US)

(73) Assignee: University of South Florida, Tampa, FL (US)

( * ) Notice: Subject to any disclaimer, the term of this patent is extended or adjusted under 35 U.S.C. 154(b) by 925 days.

(21) Appl. No.: 16/987,759

(22) Filed: Aug. 7, 2020

Related U.S. Application Data (60) Provisional application No. 62/883,968, filed on Aug. 7, 2019.

(51) Int. Cl.
*G09B 23/32* (2006.01)
(52) U.S. Cl.
CPC .................................. *G09B 23/32* (2013.01)
(58) Field of Classification Search
CPC .................................................... G09B 23/32
USPC .......................................................... 434/275
See application file for complete search history.

(56) References Cited

U.S. PATENT DOCUMENTS

| | | | |
|---|---|---|---|
| 7,931,604 B2 | 4/2011 | Zohar et al. | |
| 8,108,190 B2 | 1/2012 | Riener et al. | |
| 8,439,688 B2 | 5/2013 | Wilkins | |
| 9,142,145 B2 | 9/2015 | Tuchschmid et al. | |
| 2004/0254771 A1* | 12/2004 | Riener ................... | G09B 23/32 703/7 |

(Continued)

FOREIGN PATENT DOCUMENTS

JP            6268335 B2  *  1/2018

OTHER PUBLICATIONS

"Nursemaid's Elbow," https://web.archive.org/web/20171205042026/https://orthoinfo.aaos.org/en/diseases--conditions/nursemaids-elbow, Dec. 5, 2017 (Year: 2017).*

*Primary Examiner* — Robert P Bullington
*Assistant Examiner* — Stephen Alvesteffer
(74) *Attorney, Agent, or Firm* — Quarles & Brady LLP (57) ABSTRACT

Disclosed are various embodiments of an apparatus for practicing a reduction procedure for treating radial head subluxation. In one example, the apparatus can include a model arm can be pivotally mounted to and supported by a stand. The model arm includes an upper member that emulates an upper arm of a human, a lower member that emulates a lower arm of a human being, and a joint that pivotally connects the upper member and the lower member. A feedback mechanism can be provided within the joint of the model arm. The feedback mechanism can be configured to provide initial resistance to downward pivoting to the lower member relative to the upper member, to provide an audible and tactile pop when the procedure is successfully performed that emulates the audible and tactile pop that occurs when a human radial head pops back into place during an actual reduction procedure.

18 Claims, 11 Drawing Sheets

(56) References Cited

U.S. PATENT DOCUMENTS

2015/0199922 A1* 7/2015 Takasu .................. G09B 23/32
                                                                                     434/270
2016/0203737 A1   7/2016 Samosky et al.

* cited by examiner

APPARATUSES AND METHODS FOR PRACTICING A REDUCTION PROCEDURE FOR TREATING RADIAL HEAD SUBLUXATION

CROSS REFERENCE TO RELATED APPLICATIONS

This application claims the benefit of, and priority to, U.S. Provisional Patent Application No. 62,883,968 entitled "APPARATUSES AND METHODS FOR PRACTICING A REDUCTION PROSECURE FOR TREATING RADIAL HEAD SUBLUXATION" filed on Aug. 7, 2019, which is incorporated herein by reference in its entirety.

BACKGROUND

Radial head subluxation, sometimes referred to as "nursemaid's elbow," is a relatively common injury that occurs in early childhood. When this injury occurs, the radiocapitellar joint of the elbow partially dislocates such that the head of the radius (i.e., the radial head) partially slips out of position within the joint. A child suffering from this injury will often hold his or her arm against his or her body with the elbow bent and avoid moving the arm as this results in pain.

When radial head subluxation occurs, a reduction procedure must be performed to put the radial head back into position. While this procedure is one of the most common procedures performed by pediatric physicians and nurse practitioners in the early stages of their careers, such healthcare professionals typically do not have any way of practicing the procedure except by performing it on injured patients. In view of this, it can be appreciated that it would be desirable to have an apparatus that enables healthcare professionals to practice the reduction procedure for treating radial head subluxation before attempting it on human patients.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have an apparatus that enables healthcare professionals to practice a reduction procedure for treating radial head subluxation before attempting it on human patients. Disclosed herein are examples of such apparatuses, and methods for using them. In one embodiment, an apparatus for practicing a reduction procedure comprises a stand that supports a model arm. The model arm includes an upper member that emulates a patient's upper arm and a lower member that emulates the patient's lower arm. The model arm also includes a joint at which the upper and lower members are pivotally connected to each other. Within the joint is an internal feedback mechanism that emulates the audible and tactile "pop" that occurs when the reduction procedure is performed correctly using the model arm. As the procedure can be repeatedly practiced using the apparatus, the healthcare professional can become skilled at performing the procedure before applying it to human patients.

In the following disclosure, various specific embodiments are described. It is to be understood that those embodiments are example implementations of the disclosed inventions and that alternative embodiments are possible. Such alternative embodiments include hybrid embodiments that include features from different disclosed embodiments. All such embodiments are intended to fall within the scope of this disclosure.

Figure 1A:
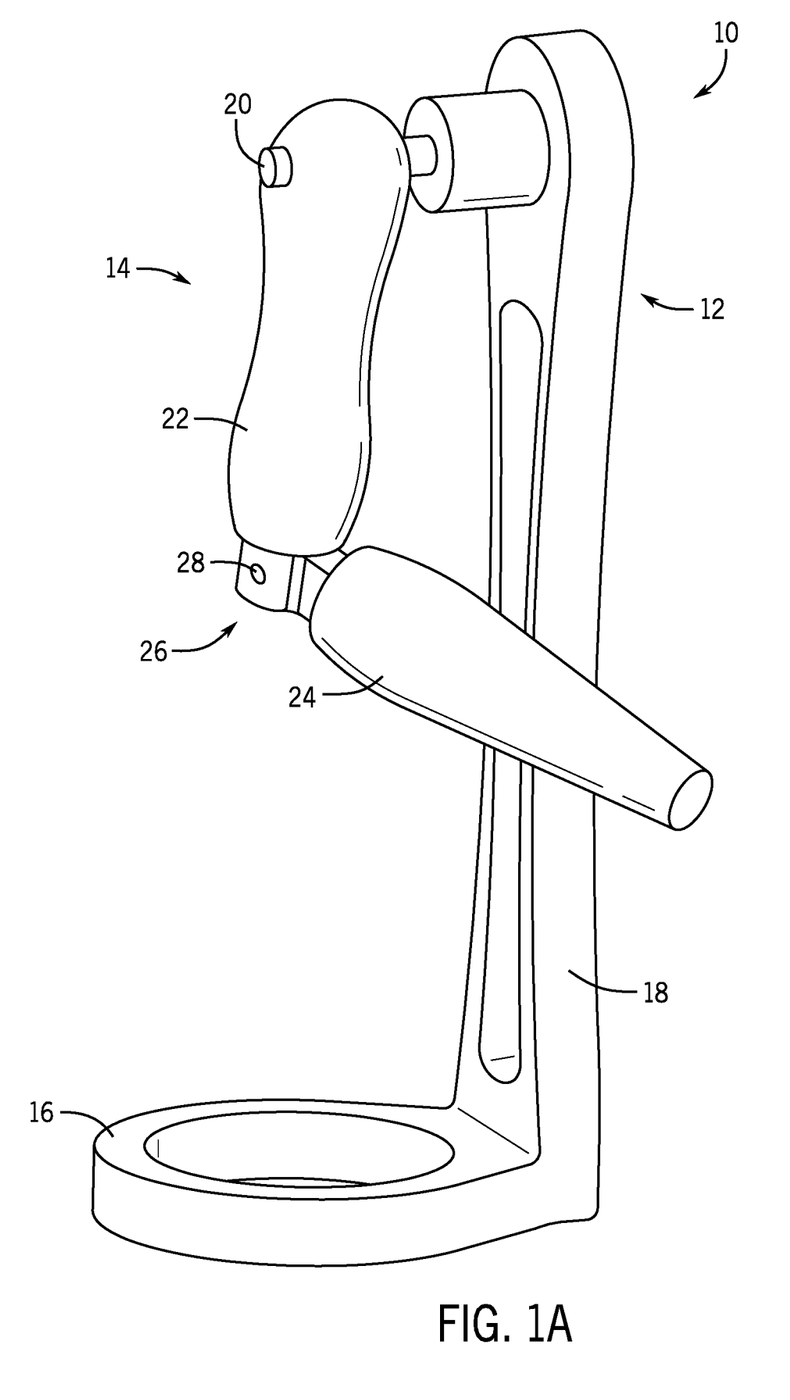
FIG. 1A is a front perspective view of an embodiment of an apparatus for practicing a reduction procedure for treating radial head subluxation.
Figure 1B:
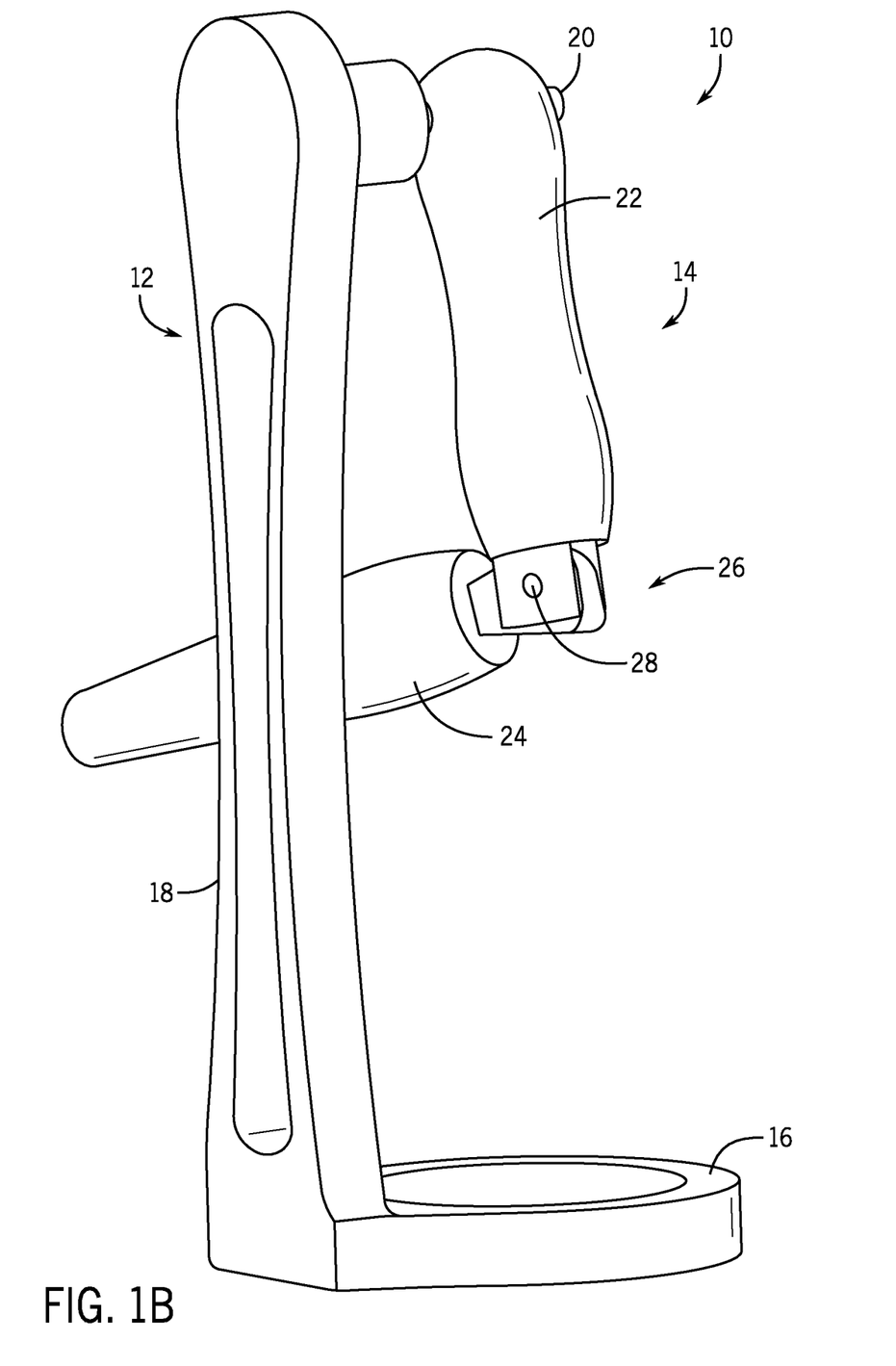
FIG. 1B is a rear perspective view of the apparatus of FIG. 1A.

FIGS. 1A and 1B illustrate an example embodiment of an apparatus 10 for practicing a reduction procedure for treating radial head subluxation. FIG. 1A generally shows the front of the apparatus 10, while FIG. 1B generally shows the rear of the apparatus. As is apparent from these figures, the apparatus 10 generally comprises a stand 12 and a model arm 14 that is supported by the stand. The stand 12 includes a base 16 configured to rest on a work surface, such as a table top, and a vertical support 18 that extends upward from the base and supports the model arm 14. Laterally (horizontally) extending from a top end of the vertical support 18 is a shaft 20 on which the model arm 14 is pivotally mounted. With such a mounting scheme, the model arm 14 is free to pivot about the shaft 20 in a similar manner to which a human arm can be pivoted forward and backward about the shoulder joint.

Figure 4A:
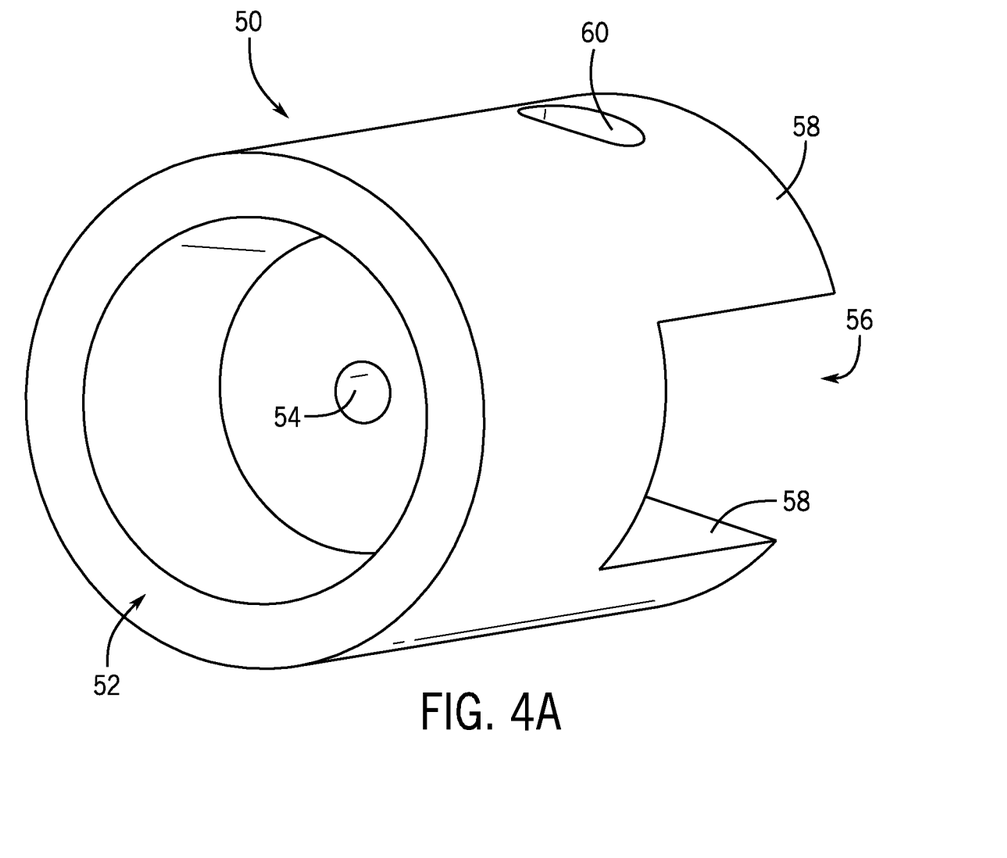
FIG. 4A is a first perspective view of an embodiment of a joint member of the apparatus of FIGS. 1A and 1B.
Figure 4B:
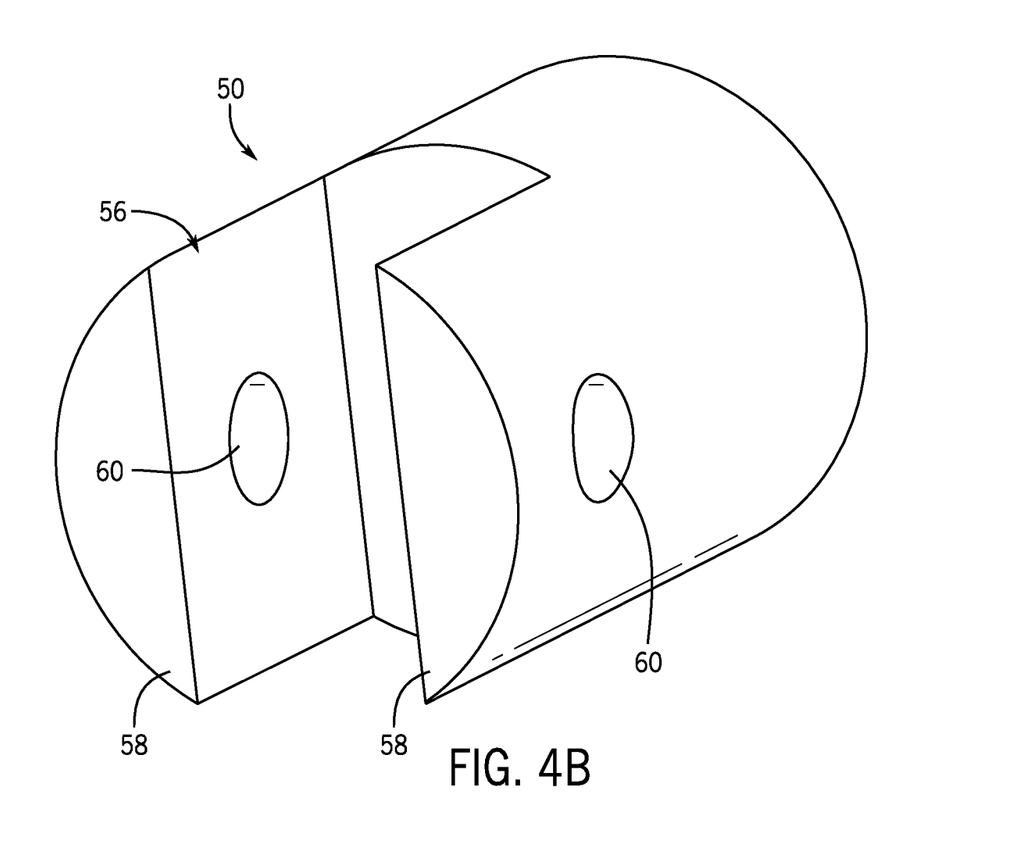
FIG. 4B is a second perspective view of the joint member of FIG. 4A.

The model arm 14 generally comprises an upper member 22 that emulates the upper arm of a human being and a lower member 24 that emulates the lower arm of the human being. It is the upper member 22 that is pivotally mounted at its top end to the shaft 20. The lower member 24 is indirectly pivotally mounted at its top end to the bottom end of the upper member at a joint 26 with a joint member described below (FIGS. 4A and 4B). The lower member 24 is free to pivot about a pivot point defined by a pin 28 that extends through the joint member. As described below, the joint 26 also includes an internal feedback mechanism that provides audible and tactile feedback to the healthcare professional when the apparatus 10 is used to practice a reduction procedure.

Figure 2:
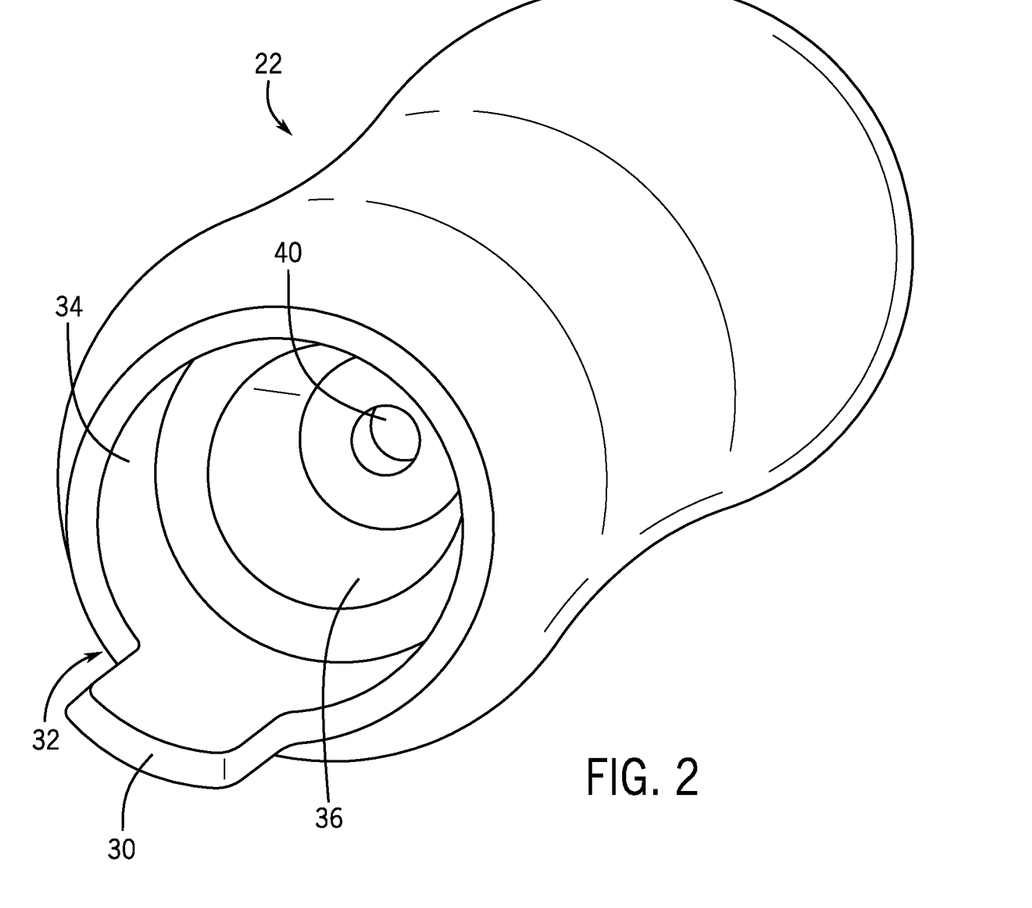
FIG. 2 is a perspective view of an embodiment of an upper member of the apparatus of FIGS. 1A and 1B.

FIG. 2 shows the bottom end of the upper member 22 in greater detail. As is apparent from this figure, a tab 30 extends downward from the bottom end of the upper member 22. As described below, this tab 30 functions to provide resistance to pivoting of the lower member 24. Also apparent from FIG. 2 is a recess 32 that is formed in the bottom end of the upper member 22. As described below, this recess 32 houses part of the aforementioned internal feedback mechanism. In the illustrated embodiment, the recess 32 comprises two distinct portions that together define the recess. These portions include a distal portion 34 that is nearer to the tab 30 and a proximal portion 36 that is farther from the tab. The distal portion 34 of the recess 32 is generally cylindrical, meaning it forms a right cylinder-shaped void, while the proximal portion 36 generally frustoconical, meaning it forms a frustrum-shaped void. The wider base of the frustrum-shaped void is nearer to the tab 30 than the narrower top of the frustrum-shaped void. Also visible in FIG. 2 is a circular passage 40 formed at the proximal end (base) of the proximal portion 36 of the recess 32 that is configured to receive a shaft of the internal feedback mechanism.

Figure 3:
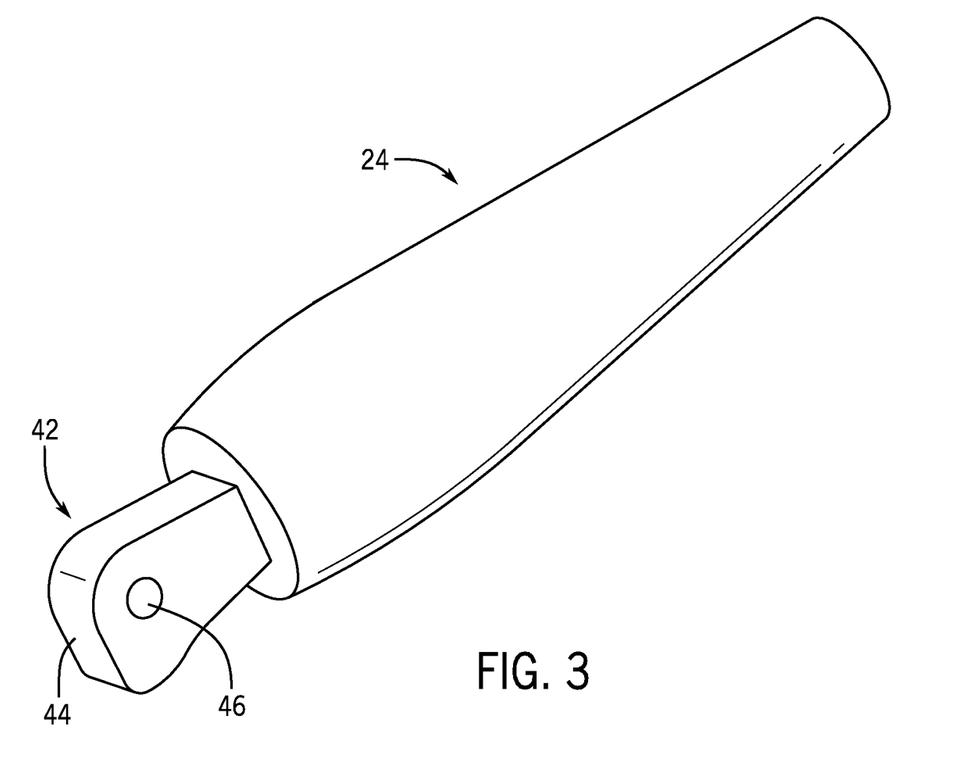
FIG. 3 is a perspective view of an embodiment of a lower member of the apparatus of FIGS. 1A and 1B.

Referring next to FIG. 3, illustrated is the lower member 24. As can be appreciated from this figure, the top end of the lower member 24 comprises a cam element 42 that is configured to actuate the internal feedback mechanism and to interface with the tab 30 of the upper member 22. The cam element 42 comprises an outer cam surface 44 that is configured to interface with a joint member described below (FIGS. 4A and 4B). A transverse circular passage 46 is formed through the cam element 42 that is configured to receive and pass the pin 28 (FIGS. 1A and 1B).

FIGS. 4A and 4B show a joint member 50 that partly defines the joint 26 of the model arm 14 and that is partially received within the recess 32 of the upper member 22. The joint member 50 also supports the pin 28 and, therefore, the lower member 24. FIG. 4A illustrates a top end of the joint member 50, while FIG. 4B illustrates a bottom end of the joint member. With reference to FIG. 4A, a frustoconical recess 52 is formed in the top end of the joint member 50. Formed in the proximal end (base) of this recess 52 is a further circular passage 54 that is configured to receive the shaft of the internal feedback mechanism. With reference to FIG. 4B, a rectangular slot 56 is formed at the distal end of the joint member 50. The slot 56 is shaped and configured to receive the cam element 42 of the lower member 24 and is defined by two opposed flanges 58. Extending through each flange 58 is a circular passage 60 that is also configured to receive and pass the pin 28 (FIGS. 1A and 1B).

Figure 5:
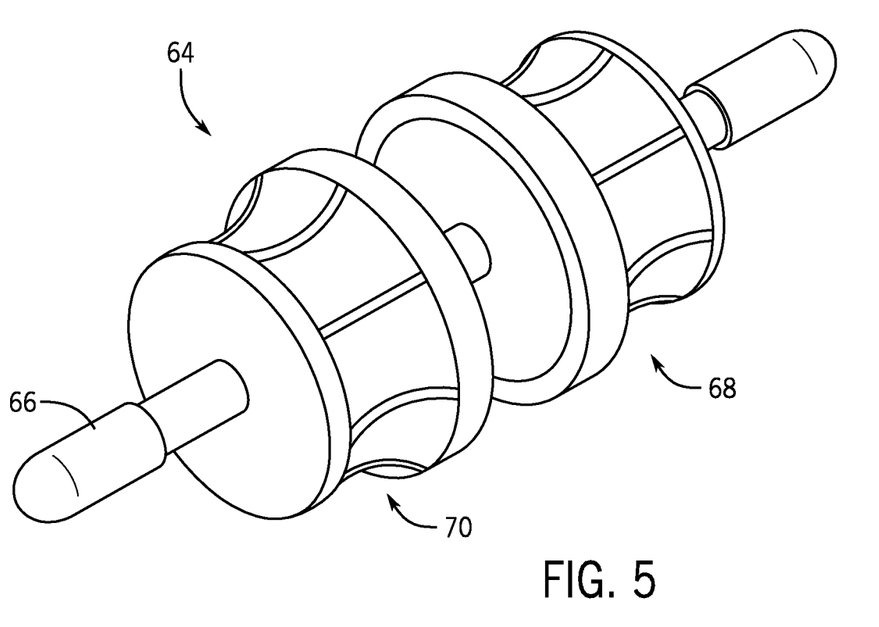
FIG. 5 is an embodiment of an internal feedback mechanism provided within a joint of the model arm shown in FIGS. 1A and 1B.

FIG. 5 shows the internal feedback mechanism 64 that has been identified multiple times above. This mechanism 64 comprises an elongated shaft 66 on which is provided first (upper) and second (lower) magnetic elements 68 and 70. These magnetic elements 68, 70 are frustoconical in shape and, therefore, are configured to be received in the recess 32 (e.g., the proximal portion 36) of the upper member 22 and the recess 52 of the lower member 24, respectively (see FIGS. 7A and 7B). As described below, the magnetic element 70 is capable of being linearly displaced along the length of the shaft 66 for the purpose of generating the audible and tactile feedback for the healthcare professional. In some embodiments, each magnetic element 68, 70 comprises an "smart" magnet designed such that the pair of magnets repel each other in a first relative angular orientation, but attract each other in a second relative angular orientation.

FIGS. 6A-7B illustrate operation of the apparatus 10 as well as the location, orientation, and operation of the internal feedback mechanism 64 when a reduction procedure is practiced by a healthcare professional (i.e., user) using the apparatus. Beginning with FIG. 6A, the model arm 14 is in an initial (bent) orientation that emulates how a human patient with a radial head subluxation would likely hold his or her arm. As is apparent from FIG. 6A, when the model arm 14 is in this orientation, the arm is bent such that the lower member 24 is generally perpendicular to the upper member 22 (i.e., the arm is bent at a 90° angle).

Figure 6A:
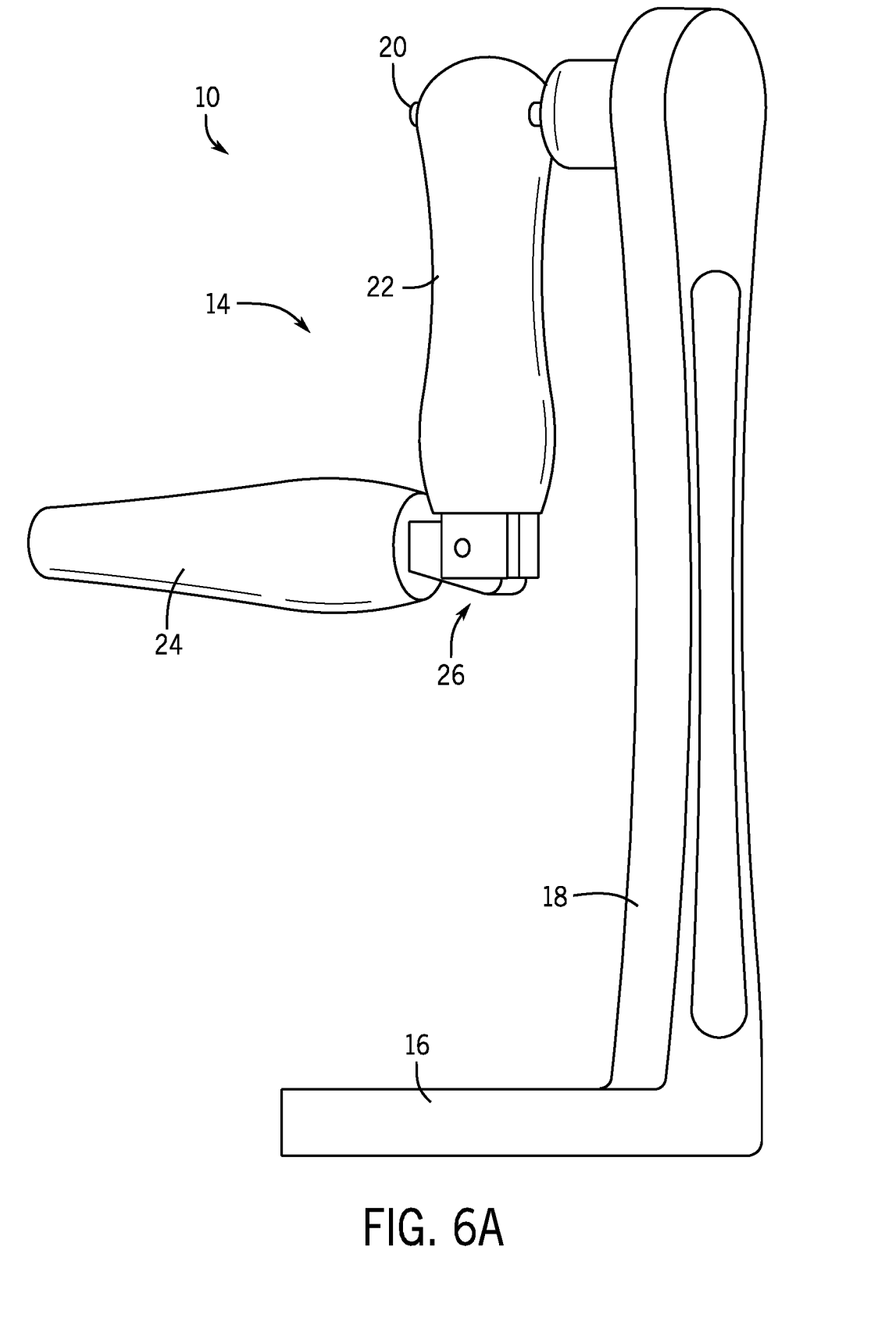
FIG. 6A is a perspective view of the apparatus of FIGS. 1A and 1B shown in an initial orientation before the reduction procedure is practiced using the apparatus.
Figure 6B:
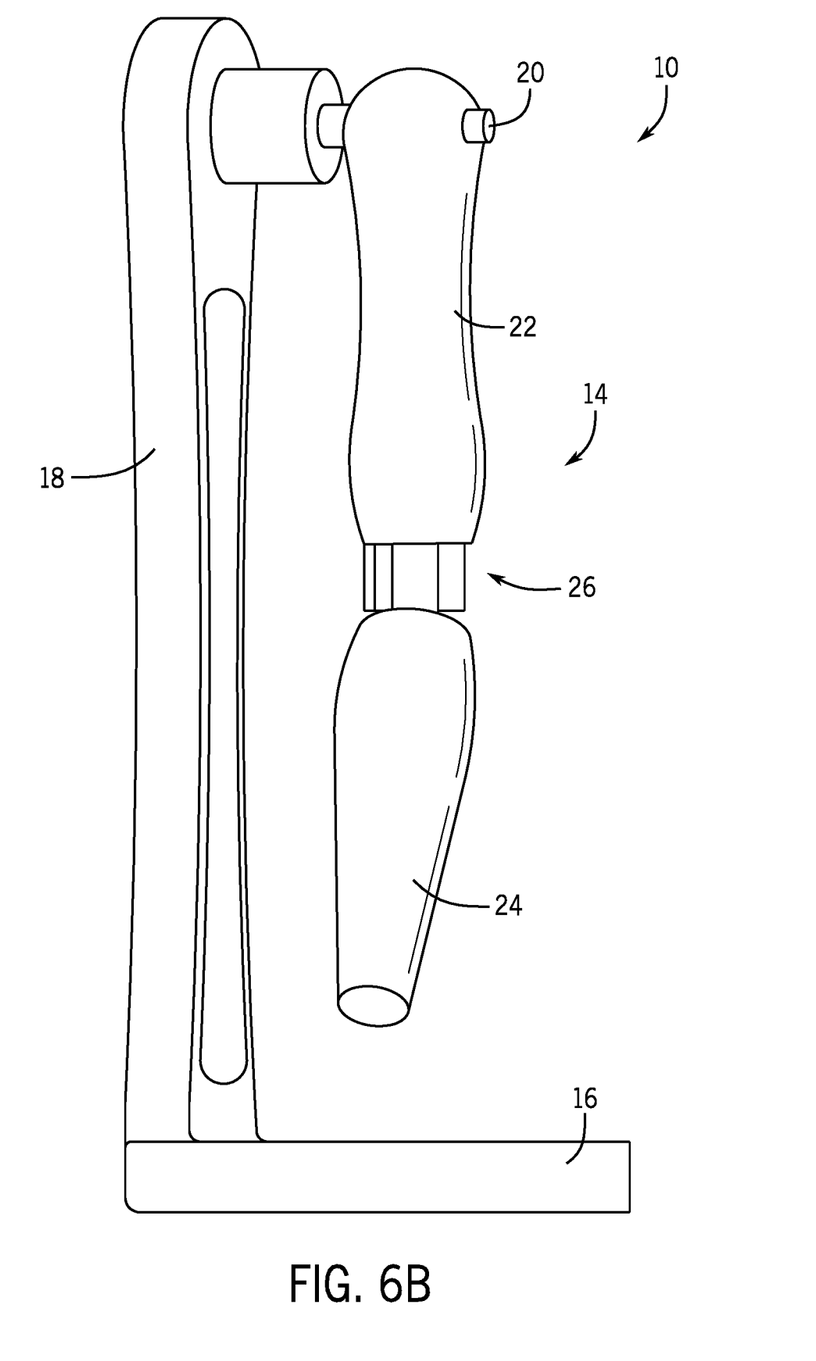
FIG. 6B is a perspective view of the apparatus of FIGS. 1A and 1B shown in a final orientation after the reduction procedure has been practiced using the apparatus.
Figure 7A:
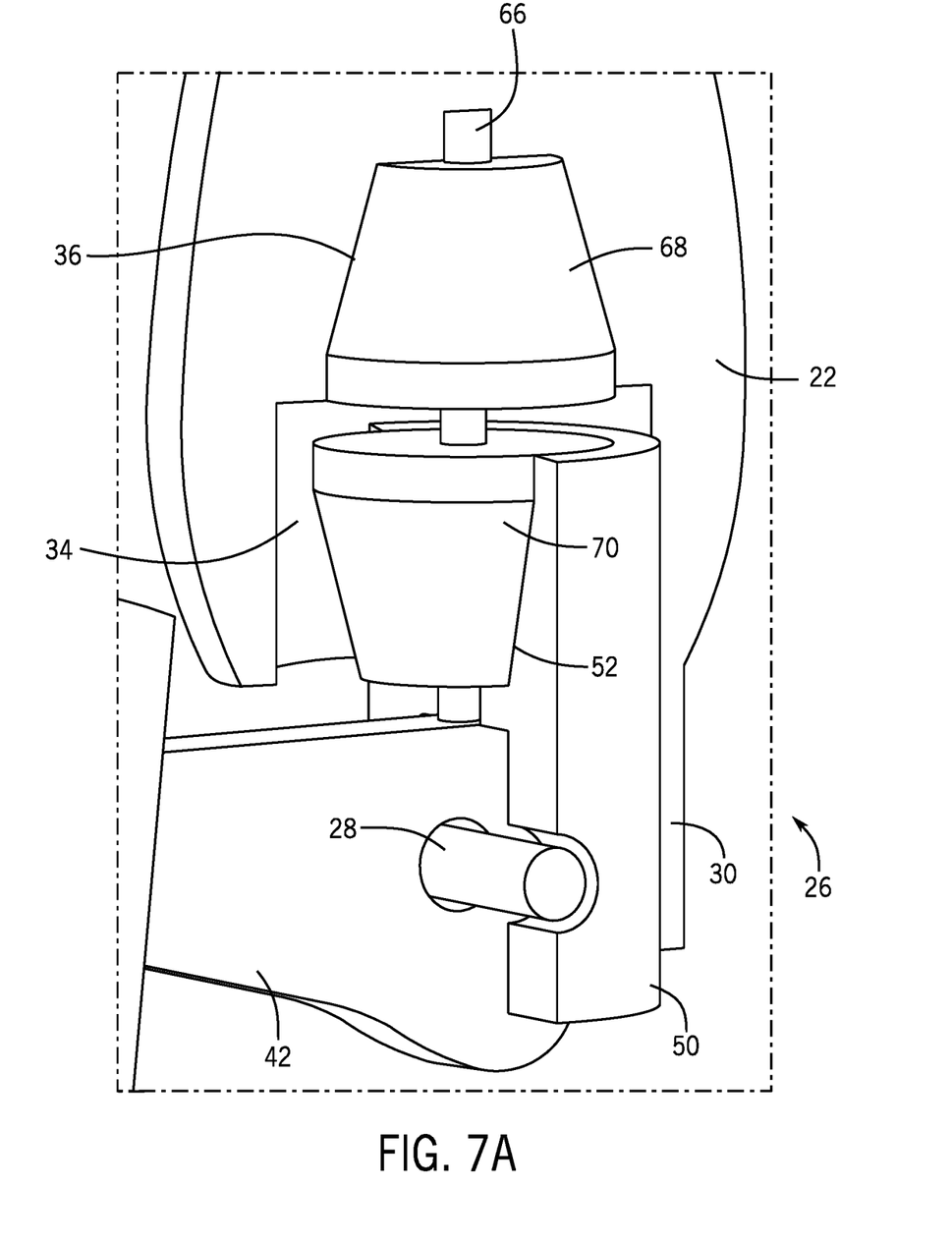
FIG. 7A is a cross-sectional perspective view showing the joint of the model arm shown in FIG. 6A, illustrating an initial orientation for the joint before the reduction procedure is practiced using the apparatus.

As shown in FIG. 7A, which illustrates the internal feedback mechanism 64 when the model arm 14 is the initial orientation shown in FIG. 6A, the upper magnetic element 68 of the mechanism is fully received within the proximal portion 36 of the recess 32 formed in the bottom end of the upper member 22. The top end of the shaft 66 and the upper magnetic element 68 can be fixedly secured within the proximal portion 36 of the recess 32 so that the shaft, the element, and the upper member 22 form an integrated component. In similar manner, the bottom end of the shaft 66 and the lower magnetic element 70 are fixedly secured within the recess 52 formed in the top end of the joint member 50, which is shown in cut-away view in FIG. 7A, so that the shaft, the element, and the joint member 50 also form an integrated component.

As can also be appreciated from FIG. 7A, a portion (approximately half) of the joint member 50 is received within the distal portion 34 of the recess 32 of the upper member 22. Instead of being secured within that distal portion 34 of the recess 32, however, the joint member 50 can be linearly displaced upward and downward along the portion and along the shaft 66 of the internal feedback mechanism 64. As shown in FIG. 7A, when the model arm 14 is in the initial orientation, space exists between the top of the joint member 50 and the base of the distal portion 34 of the recess 32. Similarly, space also exists between the upper and lower magnetic elements 68, 70. When the magnetic elements 68, 70 are in this spaced orientation, the magnetic elements 68, 70 repel each other due to their respective magnetizations. FIG. 7A also shows that the top end of the shaft 66 of the internal feedback mechanism 64 is received within the circular passage 40 formed at the base of the proximal portion 36 of the recess 32.

With further reference to FIG. 7A, the pin 28 passes through the circular passages 60 of the joint member 50 as well as the circular passage 46 of the cam element 42 of the lower member such that the lower member is pivotally mounted to the joint member. Due to the provision of the joint member 50 and its association with both the upper and lower members 22, 24, the lower member can be said to be "indirectly" pivotally mounted to the upper member.

In order to practice the reduction procedure, the healthcare professional cups the joint 26 of the model arm 14 in the palm of one hand to stabilize the arm and grips the lower member 24 as one would grip a baton with the other hand. The healthcare professional can then gently push or pull the lower member 24 downward while slightly twisting the lower member laterally away from the body, whether that is toward or away from the stand 12 in the user's mind. Moving the lower member 24 downward pivots the lower member about the pin 28, while twisting the lower member changes the relative angular orientation between the magnetic elements 68, 70 from the first relative angular orientation, in which they repel each other, to the second relative angular orientation, in which they attract each other. Notably, there is enough "play" within the joint 26 to facilitate such twisting (only a few degrees of twisting are needed). The tab 30 of the upper member 22 provides moderate resistance to the downward pivoting of the lower member 24 to emulate the resistance the user would experience when performing the procedure on a human patient.

As the lower member 24 is pivoted downward, the cam element 42 of the lower member is likewise pivoted (or rotated). Due to the shape of the outer cam surface 44, the distance between the cam surface and the pivot point (i.e., the pin 28) increases at the point at which the bottom end of the joint member 50 contacts the cam surface. This increase in distance linearly displaces the joint member 50 upward within the distal portion 34 of the recess 32 of the upper member 22 and, therefore, moves the lower magnetic element 70 closer to the upper magnetic element 68.

Figure 7B:
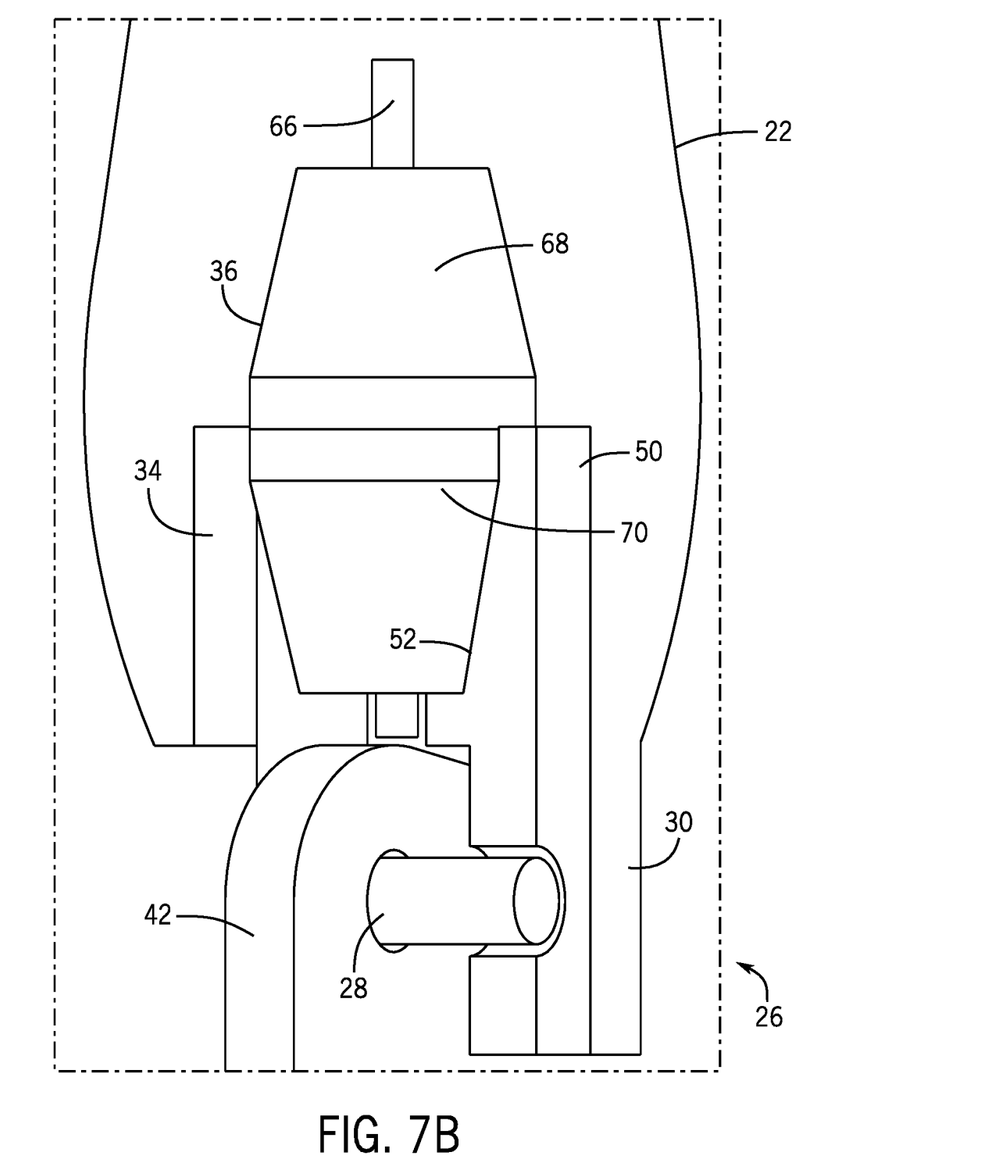
FIG. 7B is a cross-sectional perspective view showing the joint of the model arm shown in FIG. 6B, illustrating a final orientation for the joint after the reduction procedure has been practiced using the apparatus.

As the lower member 24 continues to be pivoted downward, the magnetic elements 68, 70 eventually forcefully attract each other. Because of this attraction, the magnetic elements 68, 70 tend to suddenly snap together, as shown in FIG. 7B, creating a subtle audible and tactile "pop" similar to that experienced when the radial head of a human patient pops back into place. This pop provides feedback to the healthcare professional that confirms that the reduction procedure has been successfully performed. At that point, the reduction procedure is complete and the model arm 14 has reached its final (extended) orientation shown in FIG. 6B in which the arm is nearly straight. The model arm 14 can then be restored to its initial orientation shown in FIG. 6A, and the process can be repeated. As the reduction procedure can be repeated by the healthcare professional as often as needed or desired, the individual can acquire skill in performing the procedure before ever having to perform it on a human being.

The invention claimed is:

1. An apparatus for practicing a reduction procedure for treating radial head subluxation, the apparatus comprising:
    a stand;
    a model arm that is pivotally mounted to and supported by the stand, the model arm including an upper member that emulates an upper arm of a human being, a lower member that emulates a lower arm of a human being, and a joint that pivotally connects the upper member and the lower member; and
    a feedback mechanism provided within the joint of the model arm, the feedback mechanism being configured to provide initial resistance to downward pivoting of the lower member relative to the upper member, the feedback mechanism being configured to provide an audible and tactile pop when the reduction procedure is successfully performed that emulates the audible and tactile pop that occurs when a human radial head pops back into place during an actual reduction procedure, wherein the feedback mechanism comprises a shaft, and a first magnetic element and a second magnetic element mounted on the shaft, the second magnetic element being configured to linearly displace along the shaft.

2. The apparatus of claim 1, wherein the stand comprises a base and a support that extends upward from the base.

3. The apparatus of claim 1, wherein the joint includes a joint member to which the lower member is pivotally mounted.

4. The apparatus of claim 3, wherein the upper member comprises an upper member recess formed in a bottom end of the upper member, in which an upper portion of the joint member is positioned, the joint member being linearly displaceable within the upper member recess.

5. The apparatus of claim 4, wherein the upper member recess comprises a distal portion in which the joint member is positioned and a proximal portion.

6. The apparatus of claim 5, wherein a top end of the joint member comprises a joint member recess.

7. The apparatus of claim 6, wherein the first magnetic element is positioned within the proximal portion of the upper member recess and the second magnetic element is positioned within the joint member recess.

8. The apparatus of claim 7, wherein, when the model arm is in an initial bent orientation, the magnetic elements are spaced at a distance at which they repel each other.

9. The apparatus of claim 8, wherein, when the lower member of the model arm is pivoted downward by a user, the magnetic elements are moved closer together until a critical distance is reached at which point the magnetic elements forcefully attract each other.

10. The apparatus of claim 9, wherein the top end of the lower member includes a cam element and wherein downward pivoting of the lower member causes the cam element to displace the joint member and the second magnetic element upward within the distal portion of the upper member recess toward the first magnetic element.

11. The apparatus of claim 1, wherein the upper member of the model arm comprises a tab that extends from a bottom end of the upper member, wherein the tab is configured to provide resistance to downward pivoting of the lower member relative to the upper member.

12. The apparatus of claim 11, wherein the upper member of the model arm comprises an upper member recess at a bottom end of the upper member, wherein the upper member recess comprises a distal portion and a proximal portion, and the distal portion is cylindrical and is closer to the tab than the proximal portion.

13. The apparatus of claim 12, wherein the proximal portion comprises a frustrum-shaped void, wherein the frustrum-shaped void includes a base portion and a top portion, wherein the base portion is wider than the top portion.

14. The apparatus of claim 12, wherein the upper member recess comprises a circular passage that is closer to the proximal portion, wherein the circular passage is configured to receive a shaft of the feedback mechanism.

15. The apparatus of claim 1, wherein a top end of the lower member includes a cam element and wherein downward pivoting of the lower member causes an outer surface of the cam element to interface with a joint member of the joint.

16. The apparatus of claim 15, wherein the cam element comprises a transverse circular passage formed through the cam element, the transverse circular passage configured to receive a pin.

17. The apparatus of claim 15, wherein the joint member comprises a circular passage at an end of the joint member, wherein the circular passage is configured to receive a shaft of the feedback mechanism.

18. The apparatus of claim 17, wherein the end of the joint member comprises a first end, and wherein the joint member comprises a slot formed at a second end of the joint member.

* * * * *